United States Patent
Li

(10) Patent No.: US 11,069,247 B2
(45) Date of Patent: Jul. 20, 2021

(54) SYSTEMS AND METHODS FOR DISTRIBUTING A SERVICE REQUEST FOR AN ON-DEMAND SERVICE

(71) Applicant: BEIJING DIDI INFINITY TECHNOLOGY AND DEVELOPMENT CO., LTD., Beijing (CN)

(72) Inventor: Junqin Li, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 177 days.

(21) Appl. No.: 15/912,408

(22) Filed: Mar. 5, 2018

(65) Prior Publication Data

US 2018/0197419 A1    Jul. 12, 2018

Related U.S. Application Data

(63) Continuation of application No. PCT/CN2017/072660, filed on Jan. 25, 2017.

(30) Foreign Application Priority Data

May 25, 2016 (CN) .......................... 201610355259.7

(51) Int. Cl.
*G08G 1/00* (2006.01)
*H04W 4/029* (2018.01)
(Continued)

(52) U.S. Cl.
CPC ......... *G08G 1/202* (2013.01); *G01C 21/3438* (2013.01); *G01C 21/3492* (2013.01);
(Continued)

(58) Field of Classification Search
CPC ... G06Q 10/063114; G06Q 10/063116; G06Q 10/063118; G06Q 10/06312;
(Continued)

(56) References Cited

U.S. PATENT DOCUMENTS 7,080,019 B1* 7/2006 Hurzeler .............. G06Q 10/025
                                                          705/6
8,483,939 B2    7/2013 Wu
(Continued)

FOREIGN PATENT DOCUMENTS

CN    102692629 A    9/2012
CN    103035117 A    4/2013
(Continued)

OTHER PUBLICATIONS

Notice of Reason for Rejection in Japanese Application No. 2018-520103 dated Jul. 2, 2019, 6 Pages.
(Continued)

*Primary Examiner* — Anne Marie Antonucci
*Assistant Examiner* — Andrew J Cromer
(74) *Attorney, Agent, or Firm* — Metis IP LLC

(57) ABSTRACT

The present disclosure relates to systems and methods for distributing service requests for an on-demand service. The systems may perform the methods to obtain the service request; determine first information related to the service request, wherein the first information comprises at least one of a start location, a destination, or a start time; determine reference information based at least in part on the first information related to the service request; generate a modified service request based on the service request and the reference information; and send the modified service request to the at least one provider terminal.

20 Claims, 8 Drawing Sheets

(51) Int. Cl.
   *H04L 29/08* (2006.01)
   *G01C 21/34* (2006.01)
   *H04W 4/40* (2018.01)
   *G01C 21/36* (2006.01)
   *G06Q 50/30* (2012.01)
   *H04W 4/02* (2018.01)

(52) U.S. Cl.
   CPC ......... *G01C 21/3694* (2013.01); *G06Q 50/30* (2013.01); *G08G 1/00* (2013.01); *G08G 1/205* (2013.01); *H04L 29/08* (2013.01); *H04L 67/2804* (2013.01); *H04L 67/327* (2013.01); *H04W 4/025* (2013.01); *H04W 4/029* (2018.02); *H04W 4/40* (2018.02)

(58) Field of Classification Search
   CPC .. G06Q 10/08355; G06Q 50/30; G06Q 10/20; G06Q 30/0629
   See application file for complete search history.

(56) References Cited

U.S. PATENT DOCUMENTS

| | | | |
|---|---|---|---|
| 8,554,608 | B1 | 10/2013 | O'Connor |
| 2002/0165664 | A1 | 11/2002 | Park |
| 2006/0079203 | A1 | 4/2006 | Nicolini |
| 2009/0286517 | A1 | 11/2009 | Muirhead |
| 2010/0241349 | A1 | 9/2010 | Wu |
| 2011/0099040 | A1* | 4/2011 | Felt .................... G06Q 10/0631 705/7.12 |
| 2011/0144904 | A1* | 6/2011 | Pinkus .................. G06Q 10/02 701/533 |
| 2012/0310520 | A1 | 12/2012 | Kanno et al. |
| 2013/0245936 | A1 | 9/2013 | Ando et al. |
| 2013/0325541 | A1* | 12/2013 | Capriotti ............. G06Q 10/087 705/7.21 |
| 2015/0161554 | A1 | 6/2015 | Sweeney et al. |
| 2015/0161564 | A1* | 6/2015 | Sweeney ........ G06Q 10/063114 705/338 |
| 2015/0161697 | A1 | 6/2015 | Jones et al. |
| 2015/0269152 | A1* | 9/2015 | Rekhi ............... G06F 16/24578 707/748 |
| 2016/0267504 | A1* | 9/2016 | Battista .............. G06Q 30/0201 |

FOREIGN PATENT DOCUMENTS

| | | |
|---|---|---|
| CN | 103824179 A | 5/2014 |
| CN | 103985247 A | 8/2014 |
| CN | 104183116 A | 12/2014 |
| CN | 104183123 A | 12/2014 |
| CN | 104463509 A | 3/2015 |
| CN | 104537831 A | 4/2015 |
| CN | 104794888 A | 7/2015 |
| CN | 105139228 A | 12/2015 |
| CN | 105279957 A | 1/2016 |
| EP | 0964347 B1 | 10/2007 |
| JP | 2002342891 A | 11/2002 |
| JP | 2004046309 A | 2/2004 |
| JP | 2011227088 A | 11/2011 |
| JP | 2014041604 A | 3/2014 |
| WO | 2004008799 A1 | 1/2004 |

OTHER PUBLICATIONS

European Search Report in Application No. 17801911.3 dated May 25, 2018, 7 pages.
Database EPODOC[Online] European Patent Office, the Hague, NL; Dec. 3, 2014. XP002780247.
International Search Report in PCT/CN2017/072660 dated May 3, 2017, 4 pages.
Written Opinion in PCT/CN2017/072660 dated May 3, 2017, 4 pages.
First Office Action in Chinese Application No. 201610355259.7 dated Oct. 11, 2019, 12 pages.
Notice of Reason for Rejection in Japanese Application No. 2018-520103 dated Dec. 10, 2019, 6 pages.
First Office Action in Chinese Application No. 201780014095.4 dated Jan. 22, 2020, 24 pages.

* cited by examiner

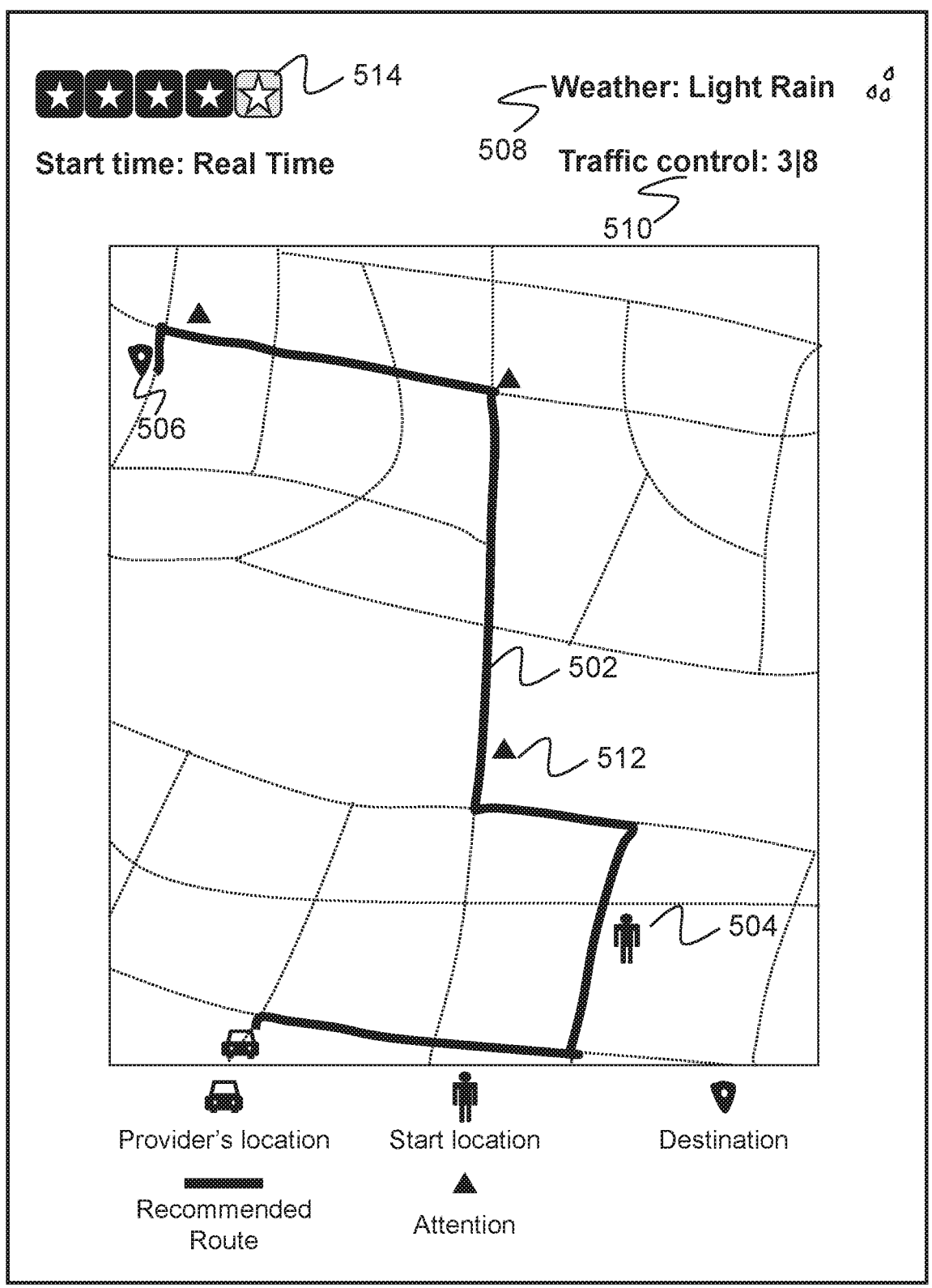
FIG. 5-A

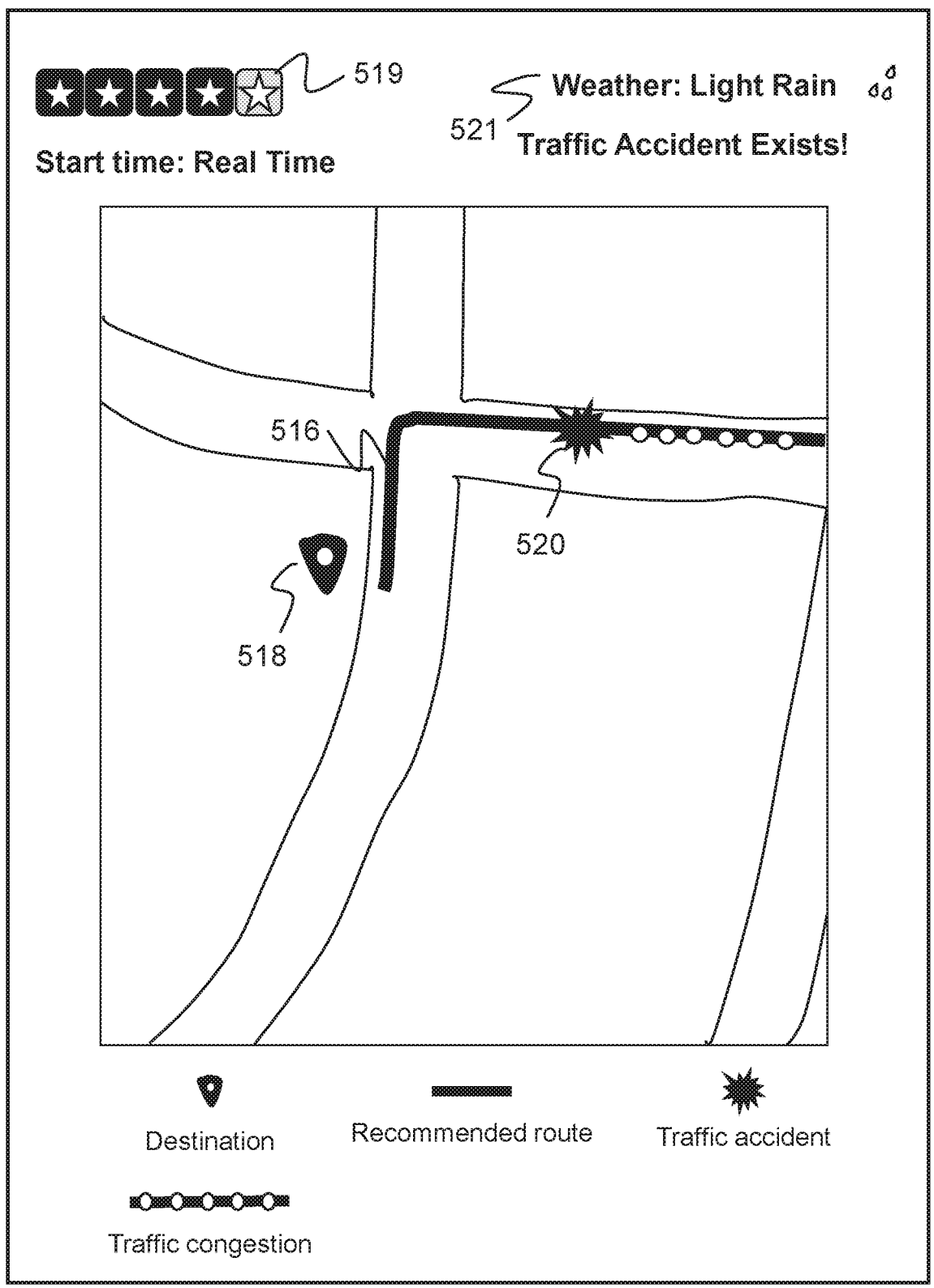
FIG. 5-B

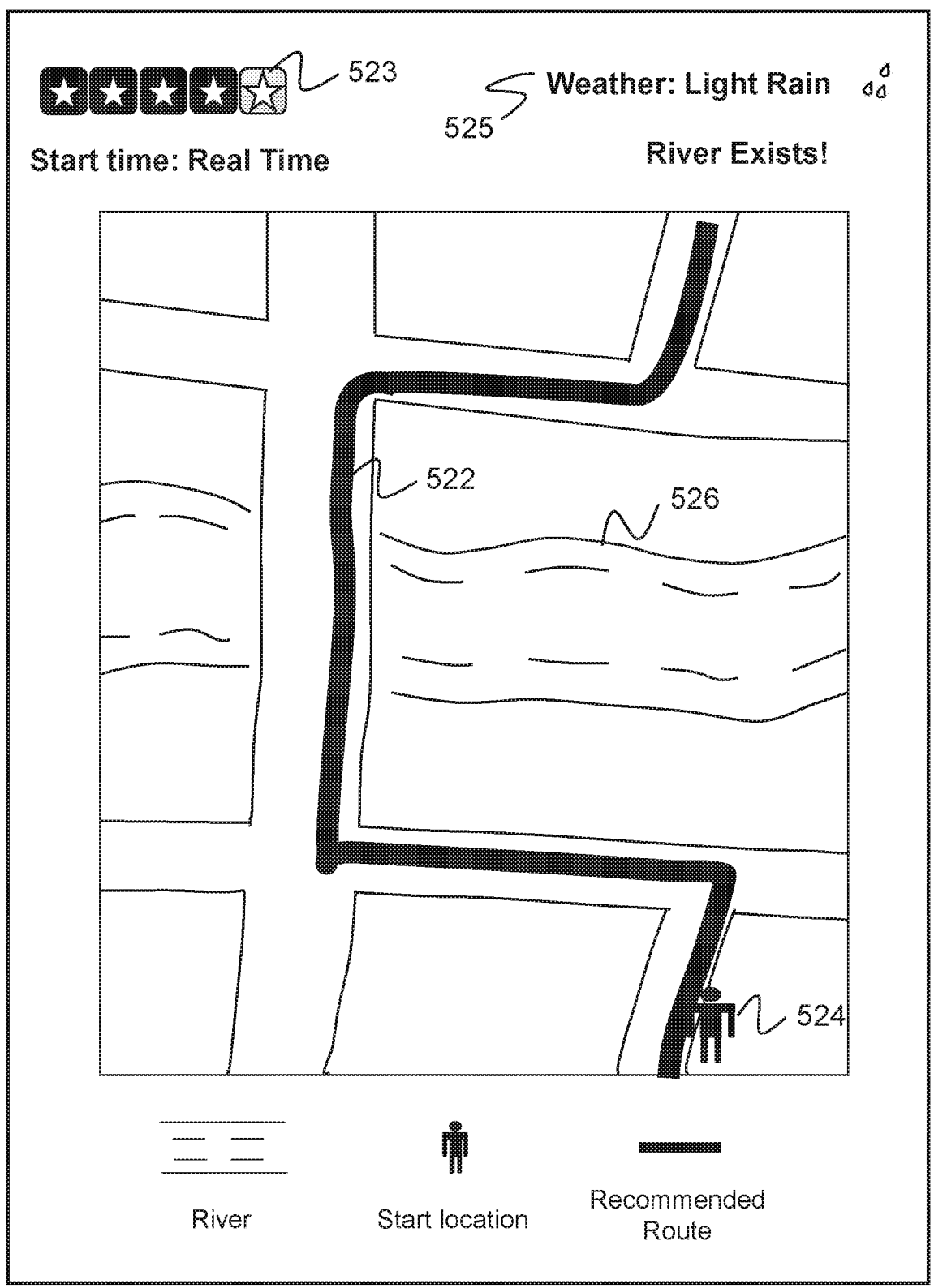
FIG. 5-C

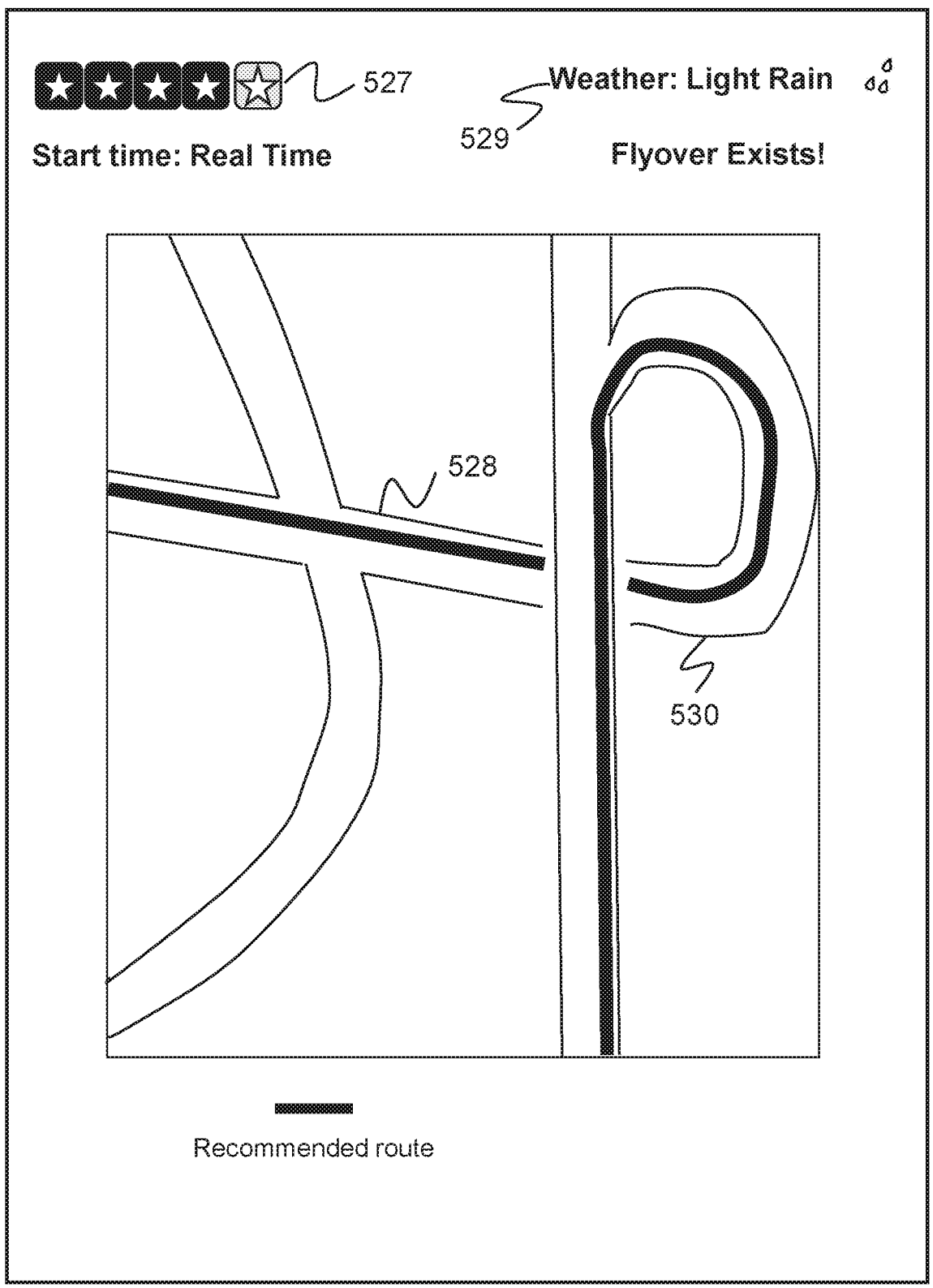
FIG. 5-D

SYSTEMS AND METHODS FOR DISTRIBUTING A SERVICE REQUEST FOR AN ON-DEMAND SERVICE

CROSS-REFERENCE TO RELATED APPLICATIONS

This application is a continuation of International Application No. PCT/CN2017/072660, filed on Jan. 25, 2017, which designates the United States of America and claims priority to Chinese Application No. 201610355259.7, filed on May 25, 2016, the contents of which are incorporated herein by reference.

TECHNICAL FIELD

The present disclosure generally relates to systems and methods for on-demand services, and in particular, to systems and methods for distributing service requests for an on-demand service.

BACKGROUND

On-demand transportation services utilizing Internet technology, such as online taxi-calling services, have become increasingly popular because of their convenience. A system providing an on-demand transportation service may need to distribute a vast number of service requests to service providers (e.g., drivers) in a real-time manner. It may be difficult for the service provider(s) to make an informed decision as to whether to accept a service request only based on the service request.

SUMMARY

According to an aspect of the present disclosure, a system is provided. The system may include at least one storage medium and at least one processor configured to communicate with the at least one storage medium. The at least one storage medium may include a set of instructions for distributing service requests for an on-demand service. When the at least one processor executing the set of instructions, the at least one processor may be directed to perform one or more of the following operations. The at least one processor may obtain the service request. The at least one processor may determine first information related to the service request, wherein the first information may include at least one of a start location, a destination, or a start time. The at least one processor may determine reference information based at least in part on the first information related to the service request. The at least one processor may generate a modified service request based on the service request and the reference information. The at least one processor may send the modified service request to the at least one provider terminal.

In some embodiments, the at least one processor may determine a recommended route based on the start location and the destination. The at least one processor may determine first reference information based on the recommended route.

In some embodiments, the first reference information may include at least one of traffic information related to the start time and the recommended route or weather information related to the start time and the recommended route.

In some embodiments, the traffic information may include at least one of traffic congestion information related to the start time and the recommended route, traffic control information related to the start time and the recommended route, or traffic barrier information related to the start time and the recommended route.

In some embodiments, the at least one processor may determine a first region within a first radius from the start location. The at least one processor may determine second reference information based on the first region.

In some embodiments, the at least one processor may determine a first number of candidate service requests in the first region. The at least one processor may determine a second number of candidate service providers in the first region. The at least one processor may determine a first supply-demand density based on the second number and the first number.

In some embodiments, the at least one processor may determine a second region within a second radius from the destination. The at least one processor may determine third reference information based on the second region.

In some embodiments, the at least one processor may determine a third number of candidate service requests in the second region. The at least one processor may determine a fourth number of candidate service providers in the second region. The at least one processor may determine a second supply-demand density based on the fourth number and the third number.

In some embodiments, the at least one processor may receive a response from the provider terminal. The at least one processor may send, to a requestor terminal associated with the service request, provider information associated with the response, wherein the provider information may include at least one of contact information of a target service provider corresponding to the response or a location of the target service provider.

In some embodiments, the at least one processor may identify at least one candidate service provider for providing a service in response to the service request, wherein the at least one provider terminal may be associated with the candidate service provider.

According to another aspect of the present disclosure, a method is provided. The method may include one or more of the following operations. A processor may obtain the service request. The processor may determine first information related to the service request, wherein the first information may include at least one of a start location, a destination, or a start time. The processor may determine reference information based at least in part on the first information related to the service request. The processor may generate a modified service request based on the service request and the reference information. The processor may send the modified service request to the at least one provider terminal.

In some embodiments, the processor may determine a recommended route based on the start location and the destination. The processor may determine first reference information based on the recommended route.

In some embodiments, the processor may determine a first region within a first radius from the start location. The processor may determine second reference information based on the first region.

In some embodiments, the processor may determine a first number of candidate service requests in the first region. The processor may determine a second number of candidate service providers in the first region. The processor may determine a first supply-demand density based on the second number and the first number.

In some embodiments, the processor may determine a second region within a second radius from the destination. The processor may determine third reference information based on the second region.

In some embodiments, the processor may determine a third number of candidate service requests in the second region. The processor may determine a fourth number of candidate service providers in the second region. The processor may determine a second supply-demand density based on the fourth number and the third number.

In some embodiments, the processor may receive a response from the provider terminal. The processor may send, to a requestor terminal associated with the service request, provider information associated with the response, wherein the provider information may include at least one of contact information of a target service provider corresponding to the response or a location of the target service provider.

In some embodiments, the processor may identify at least one candidate service provider for providing a service in response to the service request, wherein the at least one provider terminal may be associated with the candidate service provider.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 5-A through 5-D are schematic diagrams illustrating exemplary user interfaces for presenting a modified service request according to some embodiments of the present disclosure.

DETAILED DESCRIPTION

Figure 1:
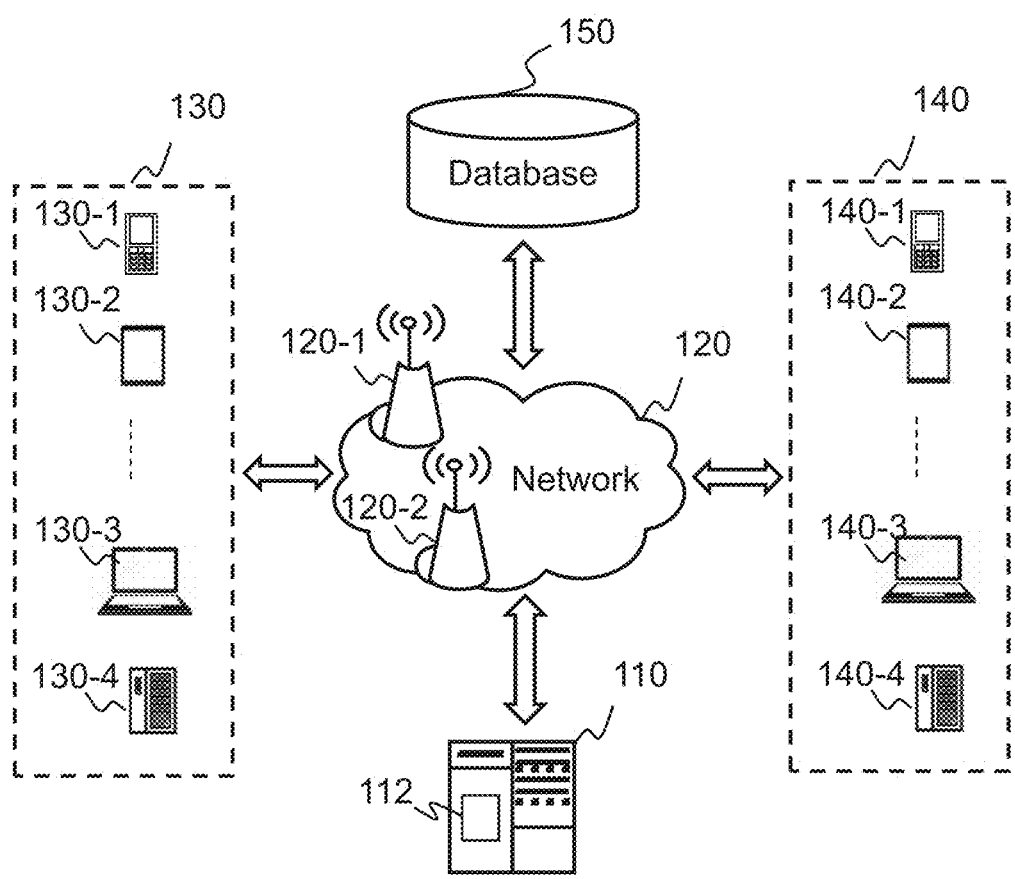
FIG. 1 is a schematic diagram of an exemplary on-demand service system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while the system and method in the present disclosure is described primarily regarding allocating a set of sharable orders, it should also be understood that this is only one exemplary embodiment. The system or method of the present disclosure may be applied to any other kind of on demand service. For example, the system or method of the present disclosure may be applied to transportation systems of different environments including land, ocean, aerospace, or the like, or any combination thereof. The vehicle of the transportation systems may include a taxi, a private car, a hitch, a bus, a train, a bullet train, a high-speed rail, a subway, a vessel, an aircraft, a spaceship, a hot-air balloon, a driverless vehicle, or the like, or any combination thereof. The transportation system may also include any transportation system for management and/or distribution, for example, a system for sending and/or receiving an express. The application of the system or method of the present disclosure may include a web page, a plug-in of a browser, a client terminal, a custom system, an internal analysis system, an artificial intelligence robot, or the like, or any combination thereof.

The term "passenger," "requestor," "service requestor," and "customer" in the present disclosure are used interchangeably to refer to an individual, an entity or a tool that may request or order a service. Also, the term "driver," "provider," "service provider," and "supplier" in the present disclosure are used interchangeably to refer to an individual, an entity or a tool that may provide a service or facilitate the providing of the service. The term "user" in the present disclosure may refer to an individual, an entity or a tool that may request a service, order a service, provide a service, or facilitate the providing of the service. For example, the user may be a passenger, a driver, an operator, or the like, or any combination thereof. In the present disclosure, "passenger" and "passenger terminal" may be used interchangeably, and "driver" and "driver terminal" may be used interchangeably.

The term "service request" and "order" in the present disclosure are used interchangeably to refer to a request that may be initiated by a passenger, a requestor, a service requestor, a customer, a driver, a provider, a service provider, a supplier, or the like, or any combination thereof. The service request may be accepted by any one of a passenger, a requestor, a service requestor, a customer, a driver, a provider, a service provider, or a supplier. The service request may be chargeable or free.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning systems may be used interchangeably in the present disclosure.

An aspect of the present disclosure relates to systems and methods for distributing a service request for an on-demand service (e.g., an on-demand transportation service). The systems and methods may obtain a service request and may determine reference information related to the service request. The systems and methods may also generate a modified service request based on the reference information and/or the service request and send the modified service request to one or more provider terminals.

It should be noted that online on-demand transportation service, such as online taxi-hailing including taxi hailing combination services, is a new form of service rooted only in post-Internet era. It provides technical solutions to users and service providers that could raise only in post-Internet era. In pre-Internet era, when a user hails a taxi on the street, the taxi request and acceptance occur only between the passenger and one taxi driver that sees the passenger. If the passenger hails a taxi through a telephone call, the service request and acceptance may occur only between the passenger and one service provider (e.g., one taxi company or agent). Online taxi, however, allows a user of the service to real-time and automatically distribute a service request to a vast number of individual service providers (e.g., taxi) distance away from the user. It also allows a plurality of service providers to respond to the service request simultaneously and in real-time. Therefore, through the Internet, the online on-demand transportation systems may provide a much more efficient transaction platform for the users and the service providers that may never meet in a traditional pre-Internet transportation service system.

FIG. 1 is a schematic diagram of an exemplary on-demand service system 100 according to some embodiments. For example, the on-demand service system 100 may be an online transportation service platform for transportation services such as taxi hailing, chauffeur services, delivery vehicles, carpool, bus service, driver hiring and shuttle services. The on-demand service system 100 may be an online platform including a server 110, a network 120, a requestor terminal 130, a provider terminal 140, and a database 150. The server 110 may include a processing engine 112.

In some embodiments, the server 110 may be a single server or a server group. The server group may be centralized, or distributed (e.g., server 110 may be a distributed system). In some embodiments, the server 110 may be local or remote. For example, the server 110 may access information and/or data stored in the requestor terminal 130, the provider terminal 140, and/or the database 150 via the network 120. As another example, the server 110 may be directly connected to the requestor terminal 130, the provider terminal 140, and/or the database 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to the service request to perform one or more functions described in the present disclosure. For example, the processing engine 112 may determine reference information based on the service request obtained from the requestor terminal 130. In some embodiments, the processing engine 112 may include one or more processing engines (e.g., single-core processing engine(s) or multi-core processor(s)). Merely by way of example, the processing engine 112 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may facilitate the exchange of information and/or data. In some embodiments, one or more components in the on-demand service system 100 (e.g., the server 110, the requestor terminal 130, the provider terminal 140, and the database 150) may send information and/or data to other component(s) in the on-demand service system 100 via the network 120. For example, the server 110 may obtain/acquire service request from the requestor terminal 130 via the network 120. In some embodiments, the network 120 may be any type of wired or wireless network, or a combination thereof. Merely by way of example, the network 130 may include a cable network, a wireline network, an optical fiber network, a telecommunications network, an intranet, the Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the on-demand service system 100 may be connected to the network 120 to exchange data and/or information.

In some embodiments, a requestor may be a user of the requestor terminal 130. In some embodiments, the user of the requestor terminal 130 may be someone other than the requestor. For example, a user A of the requestor terminal 130 may use the requestor terminal 130 to send a service request for a user B, or receive service and/or information or instructions from the server 110. In some embodiments, a provider may be a user of the provider terminal 140. In some embodiments, the user of the provider terminal 140 may be someone other than the provider. For example, a user C of the provider terminal 140 may user the provider terminal 140 to receive a service request for a user D, and/or information or instructions from the server 110. In some embodiments, "requestor" and "requestor terminal" may be used interchangeably, and "provider" and "provider terminal" may be used interchangeably.

In some embodiments, the requestor terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footgear, glasses, a helmet, a watch, clothing, a backpack, a smart accessory, or the like, or any combination thereof. In some embodiments, the mobile device may include a mobile phone, a personal digital assistance (PDA), a gaming device, a navigation device, a point of sale (POS) device, a laptop, a desktop, or the like, or any combination thereof. In some embodiments, the virtual reality device and/or the augmented reality device may include a virtual reality helmet, a virtual reality glass, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc. In some embodiments, a built-in device in the motor vehicle 130-4 may include an onboard computer, an onboard television, etc. In some embodiments, the requestor terminal 130 may be a device with positioning technology for locating the position of the requestor and/or the requestor terminal 130.

In some embodiments, the provider terminal 140 may be a device that is similar to, or the same as the requestor terminal 130. In some embodiments, the provider terminal 140 may be a device utilizing positioning technology for locating the position of a user of the provider terminal 140 (e.g., a service provider) and/or the provider terminal 140. In some embodiments, the requestor terminal 130 and/or the provider terminal 140 may communicate with one or more other positioning devices to determine the position of the requestor, the requestor terminal 130, the provider, and/or the provider terminal 140. In some embodiments, the requestor terminal 130 and/or the provider terminal 140 may send positioning information to the server 110.

The database 150 may store data and/or instructions. In some embodiments, the database 150 may store data obtained from the requestor terminal 130 and/or the provider terminal 140. In some embodiments, the database 150 may store data and/or instructions that the server 110 may execute or use to perform exemplary methods described in the present disclosure. In some embodiments, database 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyrisor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the database 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the database 150 may be connected to the network 120 to communicate with one or more components in the on-demand service system 100 (e.g., the server 110, the requestor terminal 130, the provider terminal 140, etc.). One or more components in the on-demand service system 100 may access the data or instructions stored in the database 150 via the network 120. In some embodiments, the database 150 may be directly connected to or communicate with one or more components in the on-demand service system 100 (e.g., the server 110, the requestor terminal 130, the provider terminal 140, etc.). In some embodiments, the database 150 may be part of the server 110.

In some embodiments, one or more components in the on-demand service system 100 (e.g., the server 110, the requestor terminal 130, the provider terminal 140, etc.) may have permission to access the database 150. In some embodiments, one or more components in the on-demand service system 100 may read and/or modify information relating to the requestor, provider, and/or the public when one or more conditions are met. For example, the server 110 may read and/or modify one or more users' information after finishing a service. As another example, the provider terminal 140 may access information relating to the requestor when receiving a service request from the requestor terminal 130, but the provider terminal 140 may not modify the relevant information of the requestor.

In some embodiments, information exchanging of one or more components in the on-demand service system 100 may be achieved by way of requesting a service. The object of the service request may be any product.

In some embodiments, the product may be a tangible product or an immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used in the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof.

Figure 2:
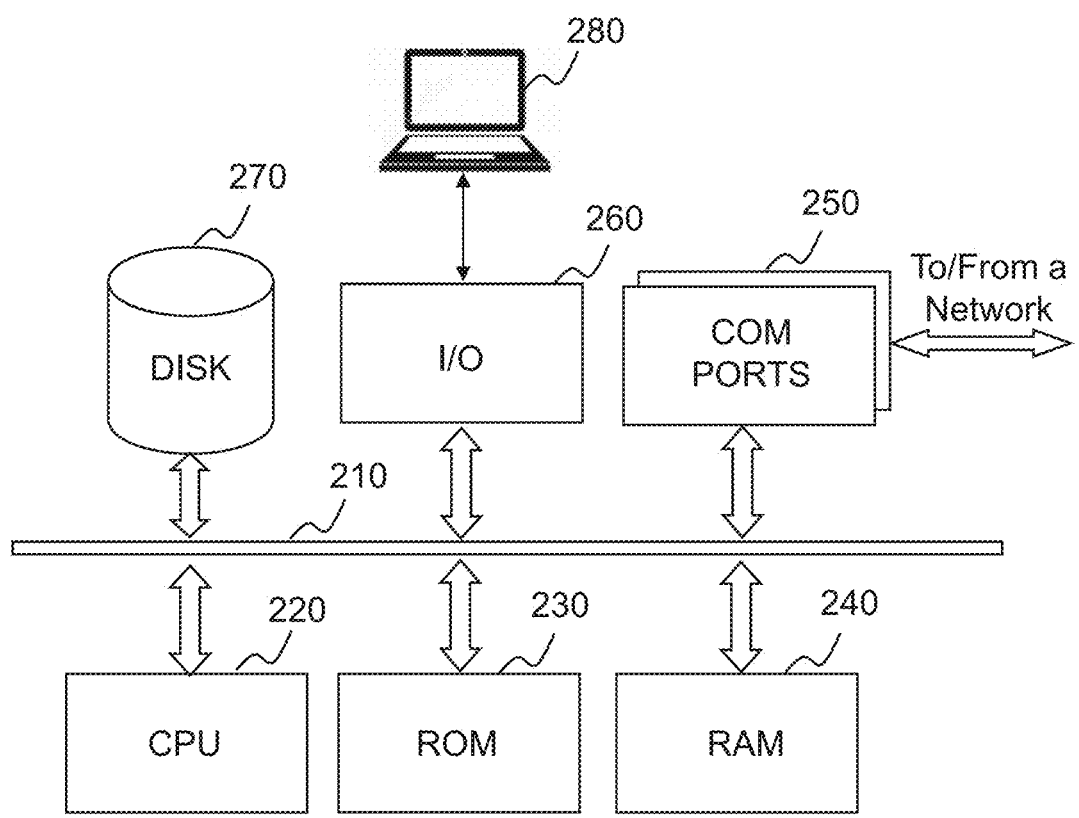
FIG. 2 is a schematic diagram illustrating an exemplary computing device according to some embodiments of the present disclosure.

FIG. 2 is a schematic diagram illustrating exemplary hardware and software components of a computing device 200 on which the server 110, the requestor terminal 130, and/or the provider terminal 140 may be implemented according to some embodiments of the present disclosure. For example, the processing engine 112 may be implemented on the computing device 200 and configured to perform functions of the processing engine 112 disclosed in this disclosure.

The computing device 200 may be a general-purpose computer or a special-purpose computer; both may be used to implement an on-demand system for the present disclosure. The computing device 200 may be used to implement any component of the on-demand service as described herein. For example, the processing engine 112 may be implemented on the computing device 200, via its hardware, software program, firmware, or a combination thereof. Although only one such computer is shown, for convenience, the computer functions relating to the on-demand service as described herein may be implemented in a distributed fashion on a number of similar platforms, to distribute the processing load.

The computing device 200, for example, may include COM ports 250 connected to and from a network connected thereto to facilitate data communications. The computing device 200 may also include a central processing unit (CPU) 220, in the form of one or more processors, for executing program instructions. The exemplary computer platform may include an internal communication bus 210, program storage and data storage of different forms, for example, a disk 270, and a read only memory (ROM) 230, or a random access memory (RAM) 240, for various data files to be processed and/or transmitted by the computer. The exemplary computer platform may also include program instructions stored in the ROM 230, RAM 240, and/or any other type of non-transitory storage medium to be executed by the CPU 220. The methods and/or processes of the present disclosure may be implemented as the program instructions. The computing device 200 also includes an I/O component 260, supporting input/output between the computer and other components therein such as user interface elements 280. The computing device 200 may also receive programming and data via network communications.

Merely for illustration, only one CPU and/or processor is illustrated in the computing device 200. However, it should be noted that the computing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, if in the present disclosure the CPU and/or processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
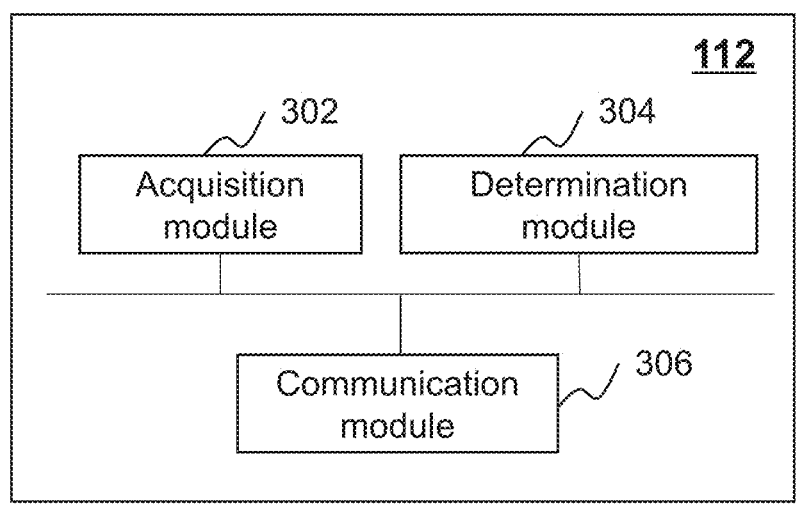
FIG. 3 is a block diagram illustrating an exemplary processing engine according to some embodiments of the present disclosure.

FIG. 3 is a block diagram illustrating an exemplary processing engine 112 according to some embodiments of the present disclosure. The processing engine 112 may include an acquisition module 302, a determination module 304, and a communication module 306.

The acquisition module 302 may be configured to obtain one or more service requests. The acquisition module 302 may obtain a service request from a requestor terminal 130 via the network 120. The acquisition module 302 may analyze the service request and determine information related to the service request (e.g., a start location, a start time, a destination, etc.).

In some embodiments, the service request may be a request for a transportation service. The service request may include information associated with a requestor that requests for the transportation service. The information associated with the requestor may include profile information of the requestor, request preference of the requestor, or the like, or a combination thereof. The profile information of the requestor may include, for example, the name of the requestor, the age of the requestor, the gender of the requestor, the date of birth of the requestor, a city in which the requestor resides, or the like, or a combination thereof. The request preference may refer to the requestor's requirements about the transportation service. For example, the requestor terminal 130 may determine a preference parameter (e.g., a vehicle type, a size of the trunk, a load of a vehicle, etc.) in the service request based on an input of the requestor. As another example, the request preference may include an indication about whether the requestor agrees to share the transportation service with other requestors in the service request.

The determination module 304 may be configured to determine reference information based on the service request. The reference information may be and/or include any information that can be used as a reference for a service provider to determine whether to accept the service request. For example, the reference information may include traffic information (e.g., traffic congestion information, traffic control information, traffic barrier information) and/or weather information.

In some embodiments, the determination module 304 may further generate a modified service request based on the reference information and/or the service request. The modified service request may include any data for use in presenting the reference information and/or any other information related to the service request.

In some embodiments, the determination module 304 can also determine one or more service providers that may accept the service request (also referred to as "candidate service providers"). For example, the determination module 304 can determine one or more service providers that may be available to provide an on-demand service responsive to the service request as the candidate service providers. For example, the determination module 304 may determine service providers that are within a predetermined distance from the start location of the service request as the candidate service providers. In some embodiments, the position of a particular service provider may be determined based on positioning information of a provider terminal associated with the service provider. The positioning information may be determined using any suitable positioning technology.

The communication module 306 may be configured to send the modified service request and/or any data related to the modified service request to one or more provider terminals associated with the candidate service provider(s). The modified service request and/or the reference information may be presented on the provider terminals of the candidate service providers. The provider terminals may present the modified service request and/or the reference information using any suitable content, such as text, images, video content, audio content, graphics, etc. In some embodiments, the modified service request and/or the reference information may be presented by presenting one or more user interfaces, such as one or more user interfaces described in connection with FIG. 5-A through 5-D.

In some embodiments, the communication module 306 may receive one or more responses from one or more of the provider terminals associated with the candidate service providers. Each of the responses may be transmitted and/or received via one or more messages using any suitable communication protocol (e.g., the Hypertext Transfer Protocol (HTTP), Address Resolution Protocol (ARP), Dynamic Host Configuration Protocol (DHCP), File Transfer Protocol (FTP), etc.). Each of the responses may include information related to an acceptance of the service request by a candidate service provider, a rejection of the service request by a candidate service provider, a request for information related to the service request, a counter offer (e.g., a request for additional fare), etc. Upon receiving the response(s), the processing engine 112 may send provider information associated with the response(s) to the requestor terminal 130 via the communication module 306. For example, in response to receiving an acceptance of the service request from a provider terminal of a candidate service provider (hereafter referred to as a "target service provider"), the processing engine 112 may send provider information of the target service provider to the requestor terminal 130. The provider information may include any information related to the target service provider, such as profile information of the target service provider (e.g., the name of the target service provider, the age of the target service provider, the gender of the target service provider, etc.), contact information (e.g., a telephone number) of the target service provider, a plate number of a vehicle of the target service provider, a current location of the target service provider, or the like, or a combination thereof.

The modules in the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units. For example, the acquisition module 302 may be integrated into the determination module 304 as a single module which may both obtain the service request and determine the reference information based on the service request. As another example, the processing engine 112 may include a storage module (not shown in FIG. 3) which may be configured to store the service request, the reference information, and/or the modified service request.

Figure 4:
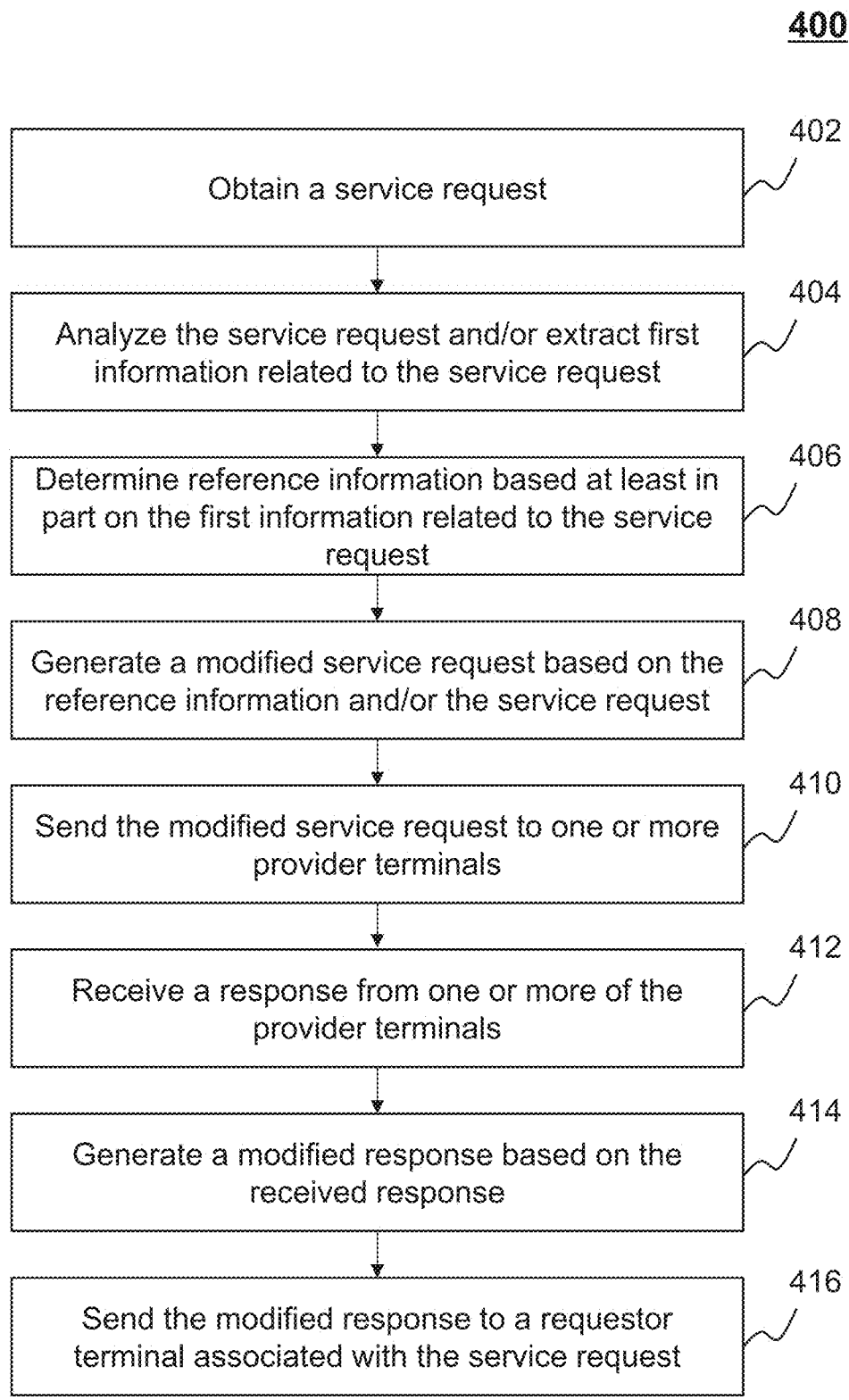
FIG. 4 is a flowchart illustrating an exemplary process for distributing a service request according to some embodiments of the present disclosure.

FIG. 4 is a flowchart illustrating an exemplary process/method 400 for distributing a service request according to some embodiments of the present disclosure. The process and/or method 400 may be executed by the on-demand service system 100. For example, the process and/or method 400 may be implemented as a set of instructions (e.g., an application) stored in the storage ROM 230 or RAM 240. The CPU 210 may execute the set of instructions and may accordingly be directed to perform the process and/or method 400.

In step 402, the processing engine 112 may obtain a service request. In some embodiments, the service request may be received from a requestor terminal (e.g., a requestor terminal 130 as described in connection with FIG. 1). The service request may be a request for a transportation service (e.g., a taxi service). The service request may be and/or include a real-time request, an appointment request, and/or any other request for one or more types of services. As used herein, the real-time request may indicate that the requestor wishes to use the transportation service at the present moment or at a defined time reasonably close to the present moment for an ordinary person in the art. For example, a service request may be a real-time request if the defined time is shorter than a threshold value, such as 1 minute, 5 minutes, 10 minutes, 20 minutes, etc. The appointment request may indicate that the requestor wishes to use the transportation service at a defined time which is reasonably far from the present moment for the ordinary person in the art. For example, a service request may be an appointment request if the defined time is longer than a threshold value, such as 20 minutes, 2 hours, or 1 day. In some embodiments, the processing engine 112 may define the real-time request or the appointment request based on a time threshold. The time threshold may be default settings of the on-demand service system 100, or may be adjustable depending on different situations. For example, in a traffic peak period, the time threshold may be relatively small (e.g., 10 minutes), otherwise in an idle period (e.g., 10:00-12:00 am), the time threshold may be relatively large (e.g., 1 hour).

In step 404, the processing engine 112 may analyze the service request and/or extract information related to the service request (also referred to herein as the "first information related to the service request"). For example, the processing engine 112 can determine a start location, a destination, a start time, an intermediate location between the start location and the destination, a current location of the requestor, etc. based on the service request. As used herein, the start location may refer to a location where a service provider can pick up the requestor. The start time may refer to a time point when the service provider can pick up the requestor. The destination may refer to a location where the service provider can drop off the requestor.

In step 406, the processing engine 112 may determine reference information based at least in part on the first information related to the service request (e.g., the start location, the destination, the start time, etc.). In some embodiments, for the real-time request, the processing engine 112 may determine real-time reference information. In some embodiments, for the appointment request, the processing engine 112 may determine estimated reference information based on historical data. For example, the processing engine 112 may average the historical data to obtain the estimated reference information.

In some embodiments, the processing engine 112 may determine one or more recommended routes based on the start location and/or the destination. Each of the recommended routes may be and/or include a path including at least a portion of a road or a street. A service provider may drive a vehicle along the path. For example, a recommended route may be a route connecting the start location and the destination. As another example, a recommended route may be a route connecting a current location of a candidate service provider and the start location. In some embodiments, the current location of the candidate service provider may be determined based on positioning information of a provider terminal associated with the candidate service provider. As a further example, a recommended route may be a route connecting the current location of the candidate service provider, the start location, and the destination.

The processing engine 112 may determine first reference information based on the recommended route(s). The first reference information may include traffic information related to the start time and the recommended route(s), weather information related to the start time and the recommended route(s), and/or any other information related to the recommended route(s).

The weather information related to the recommended route(s) may include real-time weather information, weather forecast information, etc. The processing engine 112 may obtain the weather information from the database 150, a weather information platform (e.g., a weather forecast website), and/or any other device that can provide weather information. For example, in response to obtaining a service request, the processing engine 112 can determine a start location and a destination based on the service request. The processing engine 112 can then query the weather forecast website for weather information related to the start location, the destination, and/or a recommended route from the start location to the destination (e.g., via the network 120). Alternatively or additionally, the processing engine 112 can retrieve the weather information from the database 150 or any other storage device storing the weather information.

The processing engine 112 may obtain the traffic information from the database 150, a map service (e.g., a Google Map™, a Tencent Map™, a Baidu Map™), and/or any other device and/or service that can provide traffic information related to a service request. For example, in response to receiving a real-time request, the processing engine 112 can determine a start location C and a destination D based on the real-time request. The processing engine 112 may access the database 150 to obtain real-time traffic status related to the start location C, the destination D, and/or a recommended route from C to D. The processing engine 112 may further determine an estimated time for a service provider to drive from C to D based on the real-time traffic status. As another example, in response to receiving an appointment request, the processing engine 112 may determine a start location E, a destination F, and a start time 7:00 p.m. on next Monday based on the appointment request. The processing engine 112 may access the database 150 to obtain historical traffic statuses of 7:00 p.m. from E to F in the last four Mondays and further determine an estimated time for a service provider to drive a vehicle from E to F based on the historical traffic statuses.

Merely by way of example, the traffic information may include traffic congestion information related to the start time and the recommended route, traffic control information related to the start time and the recommended route, or traffic barrier information related to the start time and the recommended route.

The traffic congestion information may indicate a traffic flow along the recommended route. The traffic flow may represent the number of vehicles passing the recommended route. The processing engine 112 may determine the traffic flow based on any suitable information related to the recommended route. For example, the processing engine 112 may determine one or more location points along the recommended route, and determine the number of vehicles passing through each of the locations points per unit time (e.g., per second, per minute, etc.). As another example, the processing engine 112 can determine the traffic flow by determining whether an event that may increase the traffic flow occurs in the vicinity of the recommended route. In some embodiments, in response to detecting occurrence of such an event, the processing engine 112 may determine that the traffic flow along the recommended route is relatively high. The event may include, for example, an accident, a concert, a sports event, etc. As used herein, an event may be regarded as being "in the vicinity" of the recommended route when a distance between a location point on the recommended route and a location of the event is less than a threshold (e.g., 500 meters, 1000 meters, etc.). As still another example, the processing engine 112 can determine the traffic flow based on a start time or any other timing information relating to the service request. More particularly, for example, the processing engine 112 may determine that the traffic flow is relatively high in response to determining that the start time is during a period of peak traffic congestion in a particular day (e.g., a morning peak period, an evening peak period, a rush hour, etc.).

In some embodiments, the processing engine 112 may determine a plurality of congestion levels indicative of various degrees of traffic congestion. The congestion levels may be determined, for example, based on the traffic flow. The congestion levels may be represented using one or more characters, numbers, letters, symbols, strings, etc. For example, the congestion levels may include "heavy congestion," "normal congestion," "mild congestion," "smooth traffic," "level 1," "level 2," "level a," and/or any other level that can indicate a degree of traffic congestion. In some embodiments, as illustrated in Table 1, the processing engine 112 may define different values or features for the plurality of congestion levels.

TABLE 1 a table illustrating exemplary congestion levels

| Congestion level | Traffic flow | Value | Feature |
|---|---|---|---|
| heavy congestion | F < a | 4 | dark red |
| normal congestion | a < F < b | 3 | red |
| mild congestion | b < F < c | 2 | yellow |
| smooth traffic | F > c | 1 | green |

As shown in Table 1, each of parameters "a," "b," and "c" may refer to a threshold of traffic flow (also referred to as the "traffic flow threshold"), and F may refer to a traffic flow of a specific location point at a specific time point. The traffic flow thresholds may be default settings of the on-demand service system 100 or may be adjustable in different situations. For example, the traffic flow thresholds may be different for different cities.

The traffic control information may indicate a traffic restriction related to a plate number of a vehicle, which means that vehicles with specific plate numbers (e.g., trail number "3") may be banned in a pre-determined geographical area (e.g., a city, a region of a city, etc.).

The traffic barrier information may indicate that to arrive at the destination of the service request, a service provider may have to detour to pass around a barrier. The barrier may include, for example, a river, a railway track, an accident, a flyover, a construction site, or the like, or a combination thereof. For example, the processing engine 112 may determine that there is a barrier (e.g., a river) between two a first location point and a second location point (e.g., a location of a candidate service provider and the start location of the service request) on the recommended route. While a straight-line distance between the first location point and the second location point is relatively short (e.g., 300 meters or any other distance that can be regarded as being short), but in order to pass around the barrier, the candidate service provider may have to travel an additional distance (e.g., 5 km, etc.). In some embodiments, a distance between two location points may be regarded as being relatively short when the distance is not greater than a predetermined threshold.

In some embodiments, the processing engine 112 may determine the traffic barrier information based on a questionnaire survey initiated in advance. For example, in response to receiving a questionnaire survey result which indicates that a majority (e.g., 85%) of service providers determine that he/she will not accept a service request if there is a river across the recommended route, the processing engine 112 may determine the river as a traffic barrier.

In some embodiments, the processing engine 112 may further determine a region in the vicinity of the start location or the destination and further determine reference information (e.g., a supply-demand density, a request density, etc.) based on information of the region. As used herein, a region may be regarded as being "in the vicinity" of the start location or the destination when the region is within a specific radius from the start location or the destination, wherein the specific radius may be less than a threshold (e.g., 1 km).

The supply-demand density may be determined based on a ratio of the number of candidate service providers in a region to the number of candidate service requests in the region. For example, the supply-demand density may be determined based on formula (1) below:

$$SD = \frac{N_a}{N_b}, \quad (1)$$

where SD may refer to a supply-demand density; $N_a$ may refer to the number of candidate service providers in a particular region; and $N_b$ may refer to the number of candidate service requests to be distributed in the region. As used herein, a candidate service request may refer to a service request to be distributed.

The request density may be determined based on a density of candidate service requests in the region. The density of candidate service requests may represent a ratio of the number of candidate service requests in a region to a size of the region. For example, the request density may be determined based on formula (2) below:

$$RD = \frac{N_b}{S} \quad (2)$$

where RD may refer to the request density, and S may refer to an area of the region.

The processing engine 112 may determine a first region within a first radius (e.g., 1 km) from the start location and second reference information based on the first region. In some embodiments, the processing engine 112 may determine a first number of candidate service requests within a predetermined time period from the start time (e.g., the last hour, the last 3 hours, the next hour, etc.) in the first region and a second number of candidate service providers within the predetermined time period from the start time in the first region. The processing engine 112 may determine a first supply-demand density based on the first number and the second number. For a real-time request, the processing engine 112 may determine the first number of candidate service requests and the second number of candidate service providers in real time. For an appointment request, the processing engine 112 may determine the first number of candidate service requests and the second number of candidate service providers based on historical data. For example, assuming that an appointment request includes a start location H and a start time 8:00 a.m. on next Friday, the processing engine 112 may determine the first number of candidate service requests by averaging historical numbers of candidate service requests starting at 8:00 a.m. on last four Fridays. In some embodiments, the processing engine 112 may determine a first request density based on the first number of candidate service requests in the first region.

The processing engine 112 may determine a second region within a second radius (e.g., 1 km) from the destination and determine third reference information based on the second region. In some embodiments, the processing engine 112 may determine a third number of candidate service requests within a predetermined time period from the start time (e.g., the last hour, the last 3 hours, the next hour, etc.) in the second region and a fourth number of candidate service providers within the predetermined time period from the start time in the second region. The processing engine 112 may determine a second supply-demand density or a second request density based on the third number and/or the fourth number. In some embodiments, the processing engine 112 may determine a fifth number of candidate service requests with high quality within the predetermined time period from the start time (e.g., last 1 hour or 1 hour in future) in the second region. As used herein, the "candidate service request with high quality" may refer to that a distance between a start location of a candidate service request and a destination of the candidate service request is larger than a distance threshold (e.g., 25 km), or a pedestrian flow density within a predefined region in vicinity of the start location or the destination is larger than a flow threshold. For example, for an appointment request with a start time 8:00 a.m., the processing engine 112 may obtain historical numbers of candidate service requests with high quality with a start time 8:00 a.m. in the last 7 days and average the historical numbers to determine the fifth number.

In some embodiments, the reference information may also include a grade of the service request. The grade may indicate a recommendation level of the service request. The higher the grade is, the more possible a candidate service provider may accept the service request. For example, if the reference information indicates that the traffic is smooth along the recommended route, the processing engine 112 may determine a relatively high grade (e.g., 5 stars) for the service request. As another example, if a certain portion (e.g., 70%) of the recommended route is under heavy congestion, the processing engine 112 may determine a relatively low grade (e.g., 3 stars) for the service request. As a further example, if the processing engine 112 determines that an extreme weather condition (e.g., a typhoon) may occur at the start time, the processing engine 112 may determine a relatively low grade (e.g., 2 stars) for the service request.

In step 408, the processing engine 112 may generate a modified service request based on the reference information and/or the service request. For example, the processing engine 112 can combine the reference information and information extracted from the service request to generate the modified request. The modified request may include any data for use in presenting the reference information and/or any other information related to the service request. The data may include, for example, data that can be used to present any suitable content related to the modified service request, such as video content, audio content, images, text, graphics, web pages, etc. In some embodiments, the processing engine 112 can generate data for use in presenting one or more user interfaces including the reference information, such as one or more user interfaces as described in connection with FIG. 5-A through 5-D below.

In step 410, the processing engine 112 may send the modified service request to one or more provider terminals. In some embodiments, the provider terminal(s) may correspond to one or more candidate service providers. In response to receiving the modified service request, the provider terminal(s) may prompt the candidate service provider(s) to indicate whether to accept the service request. In some embodiments, the modified service request and/or the reference information may be displayed on the provider terminals of the candidate service provider (e.g., see FIG. 5-A through 5-D and the descriptions thereof).

In step 412, the processing engine 112 may receive a response from one or more of the provider terminals. The response may include a message indicative of acceptance of the service request by a service provider (e.g., the target service provider). The response may also include an identification of the service provider (e.g., a user name of the service provider, a user identification (ID), an email address, etc.).

In step 414, the processing engine 112 may generate a modified response based on the received response(s). The modified response may include any suitable information related to the received responses(s), such as an indication of acceptance of the service request, an identification of the service provider, etc. The modified response may also include any information related to the target service provider(s), such as provider information of the target service provider(s), information related to one or more vehicles to be used to provide service in response to the service request, etc. In some embodiments, the processing engine 112 can access the database 150 or any storage medium disclosed elsewhere in the present disclosure based on the identification of the target service provider to obtain provider information of the target service provider. The modified response may be generated by generating one or more messages based on any suitable communication protocol, such as the HTTP, ARP, DHCP, FTP, etc. The modified response may include any data to be used to present the information related to the response, the information related to the target service provider(s), and/or any other information related to the modified response.

In step 416, the processing engine 112 may send the modified response to a requestor terminal associated with the service request. Upon receiving the modified response, the requestor terminal may present the modified response (e.g., by presenting one or more images, video content, audio content, etc.).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step) may be added elsewhere in the exemplary process/method 400.

FIG. 5-A through 5-D illustrate exemplary user interfaces 500a, 500b, 500c, and 500d for displaying a modified service request according to some embodiments of the present disclosure. Each of the user interfaces may be presented by one or more terminals (e.g., a provider terminal, a requestor terminal, etc.). Each of the user interfaces may include one or more user interface elements (also referred to as the "UI elements") for presenting information related to the modified service request (e.g., traffic information, weather information, timing information, locational information, etc.). Each of the UI elements may be and/or include, for example, one or more buttons, icons, checkboxes, message boxes, text fields, data fields, search fields, etc.

For example, as illustrated in FIG. 5-A, the user interface 500a may include a line 502 for presenting a recommended route between a start location 504 and a destination 506. In some embodiments, the start location 504 may correspond to a location of a service provider. The user interface 500a can also include one or more UI elements 508 for presenting weather information related to the modified service request. The weather information may include real time information and/or a forecast. The UI element(s) 508 may include text (e.g., "light rain"), graphics, images, and/or any other content for presenting the weather information. The user interface 500a can also include one or more UI elements 510 for presenting traffic control information (e.g., "318" which indicates that vehicles with trail number "3" or "8" may be banned along the recommended route). Further, the user interface 500a may include one or more notifications 512 (e.g., an attention for speed limit, an attention for traffic light, etc.) associated with the recommended route. The user interface 500a may include a grade of the modified service request 514.

As illustrated in FIG. 5-B, the user interface 500b may include a line 516 for presenting a portion of a recommended route between a start location (not shown) and a destination 518. The user interface 500b may include one or more UI elements 520 for presenting traffic congestion information. The traffic congestion information may be resulted from an accident. The UI element(s) 520 may include text (e.g., "Accident Exists!"), graphics, images, and/or any other content for presenting the traffic congestion information. The user interface 500b may also include a grade of the combined service request 519 and weather information 521.

As illustrated in FIG. 5-C, the user interface 500c may include a line 522 for presenting a portion of a recommended route between a start location 524 and a destination (not shown). The user interface 500c may include one or more UI elements 526 for presenting traffic barrier information. The traffic barrier may be a river. The UI element(s) 526 may include text (e.g., "River Exists!"), graphics, images, and/or any other content for presenting the traffic barrier information. The user interface 500c may also include a grade of the combined service request 523 and weather information 525.

As illustrated in FIG. 5-D, the user interface 500d may include a line 528 for presenting a portion of a recommended route between a start location (not shown) and a destination (not shown). The user interface 500d may include one or more UI elements 530 for presenting traffic barrier information. The traffic barrier may be a flyover. The UI element(s) 530 may include text (e.g., "Flyover Exists!"), graphics, images, and/or any other content for presenting the traffic barrier information. The user interface 500d may also include a grade of the combined service request 527 and weather information 529.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Pen, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

I claim:

1. A system configured to deliver a service request to a service provider terminal, comprising:
   logic circuits electronically connected to at least one storage medium via a bus, wherein during operation, the logic circuits load a set of instructions from the at least one storage medium and:
      obtain electronic signals from the bus, the electronic signals including the service request;
      determine first information related to the service request, wherein the first information comprises at least one of a start location, a destination, or a start time;
      determine, by a process, reference information based at least in part on the first information related to the service request, wherein the reference information includes a recommended route from the start location to the destination in the service request, an event location corresponding to the recommended route, and a grade of the service request, wherein the process includes:
         determining the recommended route from the start location to the destination of the service request;
         determining the event location corresponding to the recommended route based on influence of an event to the traffic flow of the recommended route; and
         determining the grade of the service request based on the recommended route, wherein the grade indicates a recommendation level of the service request and a likelihood that the service request will be accepted;

generate a modified service request by combining information extracted from the service request and the reference information, wherein:
the modified service request represents a transportation service request from the start location to the destination at the start time, and
the modified service request includes the recommended route, the event location corresponding to the recommended route, and the grade of the service request; and send out electronic signals including the modified service request to at least one provider terminal and display the modified service request in form of a route and a plurality of conspicuous symbols on a map shown on an interface of the at least one provider terminal in real-time, the plurality of conspicuous symbols indicating the first information, the recommended route, the event location corresponding to the recommended route, and the grade of service request.

2. The system of claim 1, wherein the reference information further comprises weather information related to the start time and the recommended route.

3. The system of claim 1, wherein the reference information further comprises traffic information related to the start time and the recommended route, and the traffic information comprises at least one of traffic congestion information related to the start time and the recommended route, traffic control information related to the start time and the recommended route, or traffic barrier information related to the start time and the recommended route.

4. The system of claim 1, wherein the reference information further comprises information relating to the start location, and to determine the reference information based at least in part on the first information related to the service request, the logic circuits further:
determine a first region within a first radius from the start location; and
determine the information related to the start location based on the first region.

5. The system of claim 4, wherein to determine the information related to the start location based on the first region, the logic circuits further:
determine a first number of candidate service requests in the first region;
determine a second number of candidate service providers in the first region; and
determine a first supply-demand density based on the second number and the first number.

6. The system of claim 1, wherein the reference information further comprises information relating to the destination, and to determine the reference information based at least in part on the first information related to the service request, the logic circuits further:
determine a second region within a second radius from the destination; and
determine the information relating to the destination based on the second region.

7. The system of claim 6, wherein to determine the information relating to the destination based on the second region, the logic circuits further:
determine a third number of candidate service requests in the second region;
determine a fourth number of candidate service providers in the second region; and
determine a second supply-demand density based on the fourth number and the third number.

8. The system of claim 1, wherein the logic circuits further:
receive a response from the at least one provider terminal; and
send out electronic signals, to a requestor terminal associated with the service request, including provider information associated with the response, wherein the provider information comprises at least one of contact information of a target service provider corresponding to the response or a location of the target service provider.

9. The system of claim 1, wherein the logic circuits further identify at least one candidate service provider for providing a service in response to the service request, wherein the at least one provider terminal is associated with the candidate service provider.

10. The system of claim 1, wherein the plurality of conspicuous symbols are shown on the route.

11. The system of claim 1, wherein the grade of the service request in displayed in a form of number of stars.

12. A method for delivering a service request to a service provider terminal and configured to operate an online on-demand transportation service on at least one electronic device having logic circuits, at least one storage medium, and a communication platform connected to a network, comprising:
obtaining, by the logic circuits, a service request;
determining, by the logic circuits, first information related to the service request, wherein the first information comprises at least one of a start location, a destination, or a start time;
determining, by the logic circuits, reference information based at least in part on the first information related to the service request, wherein the reference information includes a recommended route from the start location to the destination in the service request, an event location corresponding to the recommended route, and a grade of the service request, wherein the determining the reference information includes:
determining the recommended route from the start location to the destination of the service request;
determining the event location corresponding to the recommended route based on influence of an event to the traffic flow of the recommended route; and
determining the grade of the service request based on the recommended route, wherein the grade indicates a recommendation level of the service request and a likelihood that the service request will be accepted;
generating, by the logic circuits, a modified service request by combining information extracted from the service request and the reference information, wherein
the modified service request represents a transportation service request from the start location to the destination at the start time, and
the modified service request includes the recommended route, the event location corresponding to the recommended route, and the grade of the service request; and
sending, by the logic circuits, the modified service request to at least one provider terminal and displaying the modified service request in form of a route and a plurality of conspicuous symbols on a map shown on an interface of the at least one provider terminal in real-time, the plurality of conspicuous symbols indicating the first information, the recommended route, the event location corresponding to the recommended, and the grade of service request.

13. The method of claim 12, wherein the reference information further comprises weather information related to the start time and the recommended route.

14. The method of claim 12, wherein the reference information further comprises traffic information related to the start time and the recommended route, and the traffic information comprises at least one of traffic congestion information related to the start time and the recommended route, traffic control information related to the start time and the recommended route, or traffic barrier information related to the start time and the recommended route.

15. The method of claim 12, wherein the reference information further comprises information relating to the start location, and determining the reference information based at least in part on the first information related to the service request further comprises:
 determining, by the logic circuits, a first region within a first radius from the start location; and
 determining, by the logic circuits, the information related to the start location based on the first region.

16. The method of claim 15, wherein determining the information related to the start location based on the first region further comprises:
 determining, by the logic circuits, a first number of candidate service requests in the first region;
 determining, by the logic circuits, a second number of candidate service providers in the first region; and
 determining, by the logic circuits, a first supply-demand density based on the second number and the first number.

17. The method of claim 12, wherein the reference information further comprises information relating to the destination, and determining the reference information based at least in part on the first information related to the service request further comprises:
 determining, by the logic circuits, a second region within a second radius from the destination; and
 determining, by the logic circuits, the information relating to the destination based on the second region.

18. The method of claim 17, wherein determining the information relating to the destination based on the second region further comprises:
 determining, by the logic circuits, a third number of candidate service requests in the second region;
 determining, by the logic circuits, a fourth number of candidate service providers in the second region; and
 determining, by the logic circuits, a second supply-demand density based on the fourth number and the third number.

19. The method of claim 12, further comprising:
 receiving, by the logic circuits, a response from the at least one provider terminal; and
 sending, by the logic circuits, to a requestor terminal associated with the service request, provider information associated with the response, wherein the provider information comprises at least one of contact information of a target service provider corresponding to the response or a location of the target service provider.

20. A non-transitory computer-readable medium storing instructions, the instructions, when executed by a computing device, causing the computing device to implement a method, the computing device including at least one processor, the method comprising:
 obtaining, by the at least one processor, a service request;
 determining, by the at least one processor, first information related to the service request, wherein the first information comprises at least one of a start location, a destination, or a start time;
 determining, by the at least one processor, reference information based at least in part on the first information related to the service request, wherein the reference information includes a recommended route from the start location to the destination in the service request, an event location corresponding to the recommended route, and a grade of the service request, and the determining the reference information includes:
  determining the recommended route from the start location to the destination of the service request;
  determining the event location corresponding to the recommended route based on influence of an event to the traffic flow of the recommended route; and
  determining the grade of the service request based on the recommended route, wherein the grade indicates a recommendation level of the service request and a likelihood that the service request will be accepted;
 generating, by the at least one processor, a modified service request by combining information extracted from the service request and the reference information, wherein
  the modified service request represents a transportation service request from the start location to the destination at the start time, and
  the modified service request includes the recommended route, the event location corresponding to the recommended route, and the grade of the service request; and
 sending, by the at least one processor, the modified service request to at least one provider terminal and displaying the modified service request in form of a route and a plurality of conspicuous symbols on a map shown on an interface of the at least one provider terminal in real-time, the plurality of conspicuous symbols indicating the first information, the recommended route, the event location corresponding to the recommended route, and the grade of service request.

* * * * *